US009232365B1

(12) United States Patent
Mansour (10) Patent No.: US 9,232,365 B1
(45) Date of Patent: Jan. 5, 2016

(54) PUSH-TO-TALK CAPACITY ENHANCEMENT (71) Applicant: Sprint Spectrum LP, Overland Park, KS (US)

(72) Inventor: Nagi Mansour, Arlington, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 128 days.

(21) Appl. No.: 14/011,583

(22) Filed: Aug. 27, 2013

(51) Int. Cl.
*H04W 4/10* (2009.01)
*H04W 4/08* (2009.01)
*H04W 76/00* (2009.01)
*H04L 29/06* (2006.01)
*H04L 12/18* (2006.01)
*H04J 13/10* (2011.01)
*H04J 13/18* (2011.01)

(52) U.S. Cl.
CPC ........... *H04W 4/10* (2013.01); *H04L 29/06442* (2013.01); *H04L 65/4061* (2013.01); *H04L 65/4076* (2013.01); *H04W 4/08* (2013.01); *H04W 76/005* (2013.01); *H04J 13/10* (2013.01); *H04J 13/18* (2013.01); *H04L 12/1859* (2013.01)

(58) Field of Classification Search
CPC ........... H04W 4/06; H04W 4/08; H04W 4/10; H04W 76/002; H04W 76/005; H04L 65/4061; H04L 29/06442; H04L 12/1859; H04L 29/08693; H04L 65/4076; H04J 13/10; H04J 13/18; H04M 2215/2093
USPC ................. 370/312, 329, 390, 347, 342, 441; 455/518, 519, 90.2
See application file for complete search history.

(56) References Cited

U.S. PATENT DOCUMENTS

| 6,411,819 | B1 * | 6/2002 | Gutowski | H04W 16/18 455/436 |
| 7,573,837 | B1 * | 8/2009 | Mangal et al. | 370/260 |
| 7,787,885 | B1 * | 8/2010 | Mansour | 455/452.2 |
| 7,983,199 | B1 * | 7/2011 | Nguyen | H04L 65/4061 370/260 |
| 8,284,773 | B1 * | 10/2012 | Woleben et al. | 370/390 |
| 8,654,960 | B2 * | 2/2014 | Nogawa | H04M 1/2535 379/219 |
| 2002/0064145 | A1 * | 5/2002 | Khare | H04B 7/264 370/342 |
| 2004/0008679 | A1 * | 1/2004 | Sinnarajah et al. | 370/390 |
| 2004/0042438 | A1 * | 3/2004 | Jiang et al. | 370/342 |

(Continued)

OTHER PUBLICATIONS

Zhi-Yong, Shi et al., "Design and Implementation of Radio Access Link for Group Call Service Based on TD-SCDMA Network," 2010 International Conference on Computer Application and System Modeling (ICCASM 2010), 2010 IEEE.

*Primary Examiner* — Edan Orgad
*Assistant Examiner* — Ivan O Latorre (57) ABSTRACT

Push-to-talk messages are sent via a wireless multicast channel to multiple push-to-talk groups of devices regardless of group membership. Thus, all of the devices using the multicast channel receive all of the push-to-talk messages. To separate messages bound for one push-to-talk group from those bound for another, a push-to-talk group specific orthogonal code is applied to each message. The devices in a specific group use the group specific orthogonal code to decode the received multicast messages. If a device decodes the multicast message with the correct group specific orthogonal code, then the message is decoded and the device can play the message. If a device decodes the multicast message with a different group specific code (i.e., because it is not a member of the group the message was intended for), the message is will not be properly decoded and thus will be unplayable or scrambled.

13 Claims, 5 Drawing Sheets

(56) References Cited

U.S. PATENT DOCUMENTS

| | | | |
|---|---|---|---|
| 2005/0070320 A1* | 3/2005 | Dent | 455/516 |
| 2006/0116149 A1* | 6/2006 | Dunn et al. | 455/518 |
| 2007/0133478 A1* | 6/2007 | Armbruster | H04L 1/0015 370/335 |
| 2009/0004996 A1* | 1/2009 | Peleg et al. | 455/403 |
| 2009/0059832 A1* | 3/2009 | Jhamnani | H04W 72/005 370/312 |
| 2009/0080353 A1* | 3/2009 | Zhang et al. | 370/312 |
| 2009/0298530 A1* | 12/2009 | Armstrong | 455/553.1 |
| 2010/0061311 A1* | 3/2010 | Wang et al. | 370/329 |
| 2012/0014244 A1* | 1/2012 | Kishigami | H04J 13/12 370/209 |
| 2013/0059622 A1* | 3/2013 | Agulnik | H04W 4/08 455/518 |

\* cited by examiner

PUSH-TO-TALK CAPACITY ENHANCEMENT

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

The significant expansion of wireless communication networks has enabled many services and applications that use wireless devices. One of these services is known as push-to-talk (PTT). PTT may also be known as Press-to-Transmit. Push-to-talk is a method of half-duplex communication lines, such as two-way radio that often uses a momentary button to switch from voice reception mode to transmit mode. Push to Talk over Cellular (PoC) is a service option for a wireless phone network which permits subscribers to use their wireless device in a similar manner to a walkie-talkie with unlimited range. A typical push-to-talk connection application is designed to connect almost instantly. One significant advantage of push-to-talk is that it allows a single person to broadcast to an active talk group with a single button press. The members of a push-to-talk group need not make several calls to coordinate with the group.

Overview

In an embodiment, a method of operating a wireless communication system includes provisioning a multicast session from an access node to a first group of wireless devices and to a second group of wireless devices. The first group of wireless devices includes a first wireless device. The second group of wireless devices includes a second wireless device. A first push-to-talk session is provisioned with the first group of wireless devices. A second push-to-talk session is provisioned with the second group of wireless devices. A first push-to-talk multimedia message that is addressed to the first push-to-talk session is encoded by applying a first orthogonal code of a family of orthogonal codes to the first multimedia message. This creates a first encoded push-to-talk multimedia message. Using the multicast session, the first encoded push-to-talk multimedia message is transmitted to the first group of wireless devices and to the second group of wireless devices.

In an embodiment, a method of operating a wireless device includes, in response to a command received from an access node, configuring a multicast session. A push-to-talk session associated with the multicast session is configured. The wireless device is configured to receive push-to-talk multimedia messages received via the multicast session and associated with the push-to-talk session. The wireless device is configured to receive the push-to-talk multimedia messages by decoding the received push-to-talk multimedia messages using a first orthogonal code of a family of orthogonal codes.

In an embodiment, a communication system includes a push-to-talk processing node configured to send push-to-talk multimedia messages to a first push-to-talk group of wireless devices and a second push-to-talk group of wireless devices. The communication system also includes a wireless access node configured to receive the push-to-talk multimedia messages. The wireless access node is configured to forward, via a multicast channel, the push-to-talk multimedia messages to a first wireless device belonging to the first push-to-talk group of wireless devices and to a second wireless device belonging to the second push-to-talk group of wireless devices.

DETAILED DESCRIPTION

In an embodiment, push-to-talk messages are sent via a wireless multicast channel to multiple push-to-talk groups of devices regardless of group membership. Thus, all of the devices using the multicast channel receive all of the push-to-talk messages. To separate messages bound for one push-to-talk group from those bound for another, a push-to-talk group specific orthogonal code is applied to each message. The devices in a specific group use the group specific orthogonal code to decode the received multicast messages.

If a device decodes the multicast message with the correct group specific orthogonal code, then the message is decoded and the device can play the message. If a device decodes the multicast message with a different group specific code (i.e., because it is not a member of the group the message was intended for), the message will not be properly decoded and thus will be unplayable or scrambled due to the very low or zero correlation because the two orthogonal codes for the two groups are different.

Figure 1:
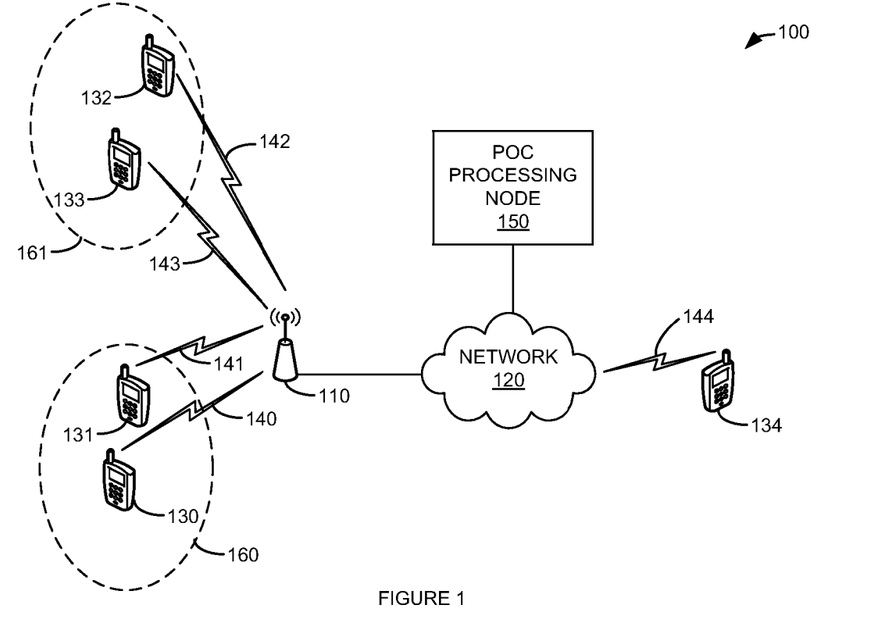
FIG. 1 is a block diagram illustrating a communication system.

FIG. 1 is a block diagram illustrating a communication system. In FIG. 1, communication system 100 includes access node 110, network 120, wireless device 130, wireless device 131, wireless device 132, wireless device 133, wireless device 134, and push-to-talk over cellular (PoC) processing node 150. Wireless device 130 is operatively coupled to access node 110 by wireless link 140. Wireless device 131 is operatively coupled to access node 110 by wireless link 141. Wireless device 132 is operatively coupled to access node 110 by wireless link 142. Wireless device 133 is operatively coupled to access node 110 by wireless link 143. Wireless device 133 is operatively coupled to network 120 by wireless link 144. Network 120 is operatively coupled to access node 110. Network 120 is operatively coupled to PoC processing node 150.

Communication system 100 is a communication network that can provide wireless communication to wireless devices 130-133. Network 120 is a communication network that can provide communication between access node 110 and other wired or wireless networks. Network 120 is a communication network that can provide communication between wireless device 134 and access node 110 via other wired or wireless networks and wireless link 144. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 and/or network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 and/or network 120 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between access node 110 and network 120 can be, for example, twisted pair cable, coaxial cable or fiber optic cable, or combinations thereof. Wireless links 140-144 can be a radio frequency, microwave, infrared, or other similar signal that uses orthogonal frequency division multiplexing (OFDM). Wireless links 140-144 can use a suitable communication protocol, for example, Worldwide Interoperability for Microwave Access (WiMAX), or Long Term Evolution (LTE), or combinations thereof. Other wireless protocols can also be used.

Other network elements may be present in communication system 100 (and present in wireless network 120, in particular) to facilitate wireless communication to/from wireless devices 130-134 but are omitted for clarity, such as base stations, base station controllers, gateways, mobile switching centers, dispatch application processors, and location registers such as a home location register or visitor location register. Furthermore, other network elements may be present to facilitate communication between access node 110 and network 120 which are omitted for clarity, including additional processing nodes, routers, gateways, and physical and/or wireless data links for carrying data among the various network elements.

Wireless devices 130-133 may be any devices, systems, combination of devices, or other such communication platforms capable of communicating wirelessly with access node 110. One or more of wireless devices 130-133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with via access node 110, and network 120. Other types of communication platforms are possible.

Wireless devices 130-133 may establish communication sessions with access node 110 in order to receive communication service. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Access node 110 is a network node capable of providing wireless communication to wireless devices 130-133. Access node 110 can be, for example, a base transceiver station, a radio access node, an eNodeB device, or an enhanced eNodeB device. Access node 110 communicates information to wireless devices 130-133 via wireless links 140-143, respectively. Access node 110 may forward push-to-talk multimedia (e.g., audio, video, A/V, or other multimedia content) messages received from PoC processing node to wireless devices 130-133.

In an embodiment, communication system 100 may provide push-to-talk service to wireless devices 130-133 and optionally wireless device 134. PoC processing node 150 may facilitate providing push to talk service to wireless devices 130-133. Communication system 100 may establish one or more push-to-talk communication sessions with wireless device 130-133. For example, communication system 100 may establish a first push-to-talk group 160 that includes wireless device 130 and wireless device 131. Communication system 100 may establish a second push-to-talk group 161 that includes wireless device 132 and wireless device 133. Optionally, communication system 100 may include other wired or wireless devices (e.g., wireless device 134) in one or more of first push-to-talk group 160 and/or second push-to-talk group 161.

PoC processing node 150 may perform the overall management of push-to-talk sessions. For example, the functions performed by PoC processing node 150 may include session handling, media distribution, burst arbitration (including talker identification), session initiation protocol (SIP) handling (such as SIP session origination, termination etc.), policy enforcement for participation is group sessions, handling of participant information, and burst control protocol negotiations.

Communication system 100 and PoC processing node 150 may provision a push-to-talk session with wireless devices 130-131 and/or wireless device 134. This provisioning may include specifying a first orthogonal code from a family of orthogonal codes to be used by access node 110 to encode push-to-talk messages sent to wireless devices 130-131. Likewise, communication system 100 and PoC processing node 150 may provision a push-to-talk session with wireless devices 132-133 and/or wireless device 134. This provisioning may include specifying a second orthogonal code from the family of orthogonal codes where the second orthogonal code is different from the first orthogonal code used with wireless devices 130-131. The second orthogonal code is to be used by access node 110 to encode push-to-talk messages sent to wireless devices 132-133.

Wireless device 130 and wireless device 131 are part of push-to-talk group 160. Thus, media from a one of wireless device 130 and wireless device 131 that has been granted the floor of push-to-talk group 160 is intended to be viewed or played by the wireless devices 130-131 that are part of push-to-talk group 160, but not intended to be viewed or played by the wireless devices 132-133 that are not part of push-to-talk group 160. Likewise, wireless device 132 and wireless device 133 are part of push-to-talk group 161. Thus, media from a one of wireless device 132 and wireless device 133 that has been granted the floor of push-to-talk group 161 is intended to be viewed or played by the wireless devices 132-133 that are part of push-to-talk group 161, but not intended to be viewed or played by the wireless devices 130-131 that are not part of push-to-talk group 160. It should be understood that the media sent and/or played by a member of a push to talk group 160-161 may include audio, video, or other multimedia content.

Communication system 100 sends push-to-talk messages (which may contain audio, video, or other multimedia content) bound for wireless devices 130-131 of push-to-talk group 160 and wireless devices 132-133 of push-to-talk group 161 via a wireless multicast channel regardless of the group membership of wireless devices 130-133. In other words, all of the wireless devices 130-133 being serviced by access node 110 are sent, via a multicast channel, all of the push-to-talk messages. Thus, all of the wireless devices 130-133 receive, via the multicast channel, all of the push-to-talk messages. For an LTE air-interface via wireless links 140-143, the LTE multicast channel—MCH, and the multicast traffic channel—MTCH, are examples of a multicast channel that can be used to send the push-to-talk messages to wireless devices 130-133.

In an embodiment, a push-to-talk group specific orthogonal code is applied to each message. The orthogonal codes applied to the various push-to-talk groups 160-161 should be different orthogonal codes, but from the same family of orthogonal codes. For example, before transmitting via a multicast channel to all wireless devices 130-133, access node 110 may multiply multimedia messages addressed to push-to-talk group 160 by a first orthogonal code (e.g., a first Walsh code from the family of Walsh codes of length N—$W_1^N$). Likewise, before transmitting via a multicast channel to all wireless devices 130-133, access node 110 may multiply multimedia messages addressed to push-to-talk group 161 by a second orthogonal code (e.g., a second Walsh code from the family of Walsh codes of length N—$W_2^N$).

Wireless devices 130-131 use the first orthogonal code to decode push-to-talk messages received from access node 110 via the multicast channel. In other words, once configured by communication system 100 with the appropriate orthogonal code, wireless devices 130-131 of push-to-talk group 160 multiply push-to-talk messages received via the multicast channel by the first orthogonal code. This decodes those push-to-talk messages intended for push-to-talk group 160 because they were encoded with the first orthogonal code. However, multiplying push-to-talk messages received via the multicast channel by the first orthogonal code when the messages were intended for a different push-to-talk group (e.g., push-to-talk group 161) does not result in the decoding of the push-to-talk message.

Wireless devices 130-131 of push-to-talk group 160 may be able to determine that a message was successfully or not successfully decoded. For example, wireless devices 130-131 may determine that a message was successfully or not successfully decoded by examining a correlation of the decoded message. A message decoded using the correct orthogonal code (i.e., a message intended for push-to-talk group 160) will have a high correlation when multiplied by the first orthogonal code. However, a message decoded using the incorrect orthogonal code (i.e., a message intended for push-to-talk group 161) should have a low correlation when multiplied by the first orthogonal code. In another example, wireless devices 130-131 may determine that a message was successfully or not successfully decoded using the results of a decoder algorithm. For example, a specific audio/video encoder (e.g., MPEG-3) may fail when presented with data from a push-to-talk message that was decoded using the wrong orthogonal code.

The determination of whether a message was successfully decoded may be used by a wireless device 130-131 as a basis for playing/not playing the decoded message to the user of a wireless device 130-131. In other words, when a wireless device 130-133 determines a decoded push-to-talk message data is valid, it will play the push-to-talk message. Should the wireless device 130-133 determine a decoded push-to-talk message data is invalid, it may not play the push-to-talk message.

As described herein, the different orthogonal codes for each push-to-talk group 160-161 are known to both access node 110 (and/or PoC processing node 150) and wireless devices 130-133. Access node 110 (and/or PoC processing node 150) multiplies the content of messages bound for each push-to-talk group 160-161 by the orthogonal code associated with the respective push-to-talk group 160-161. A wireless device 130-133 multiplies the received messages by the orthogonal code associated with the push-to-talk group 160-161 that a respective wireless device 130-133 is a member of.

For example, eight (8) different orthogonal codes may be assigned to eight (8) push-to-talk groups 160-161 in a sector served by access node 110. At wireless devices 130-133, when push-to-talk messages are multiplied by one of these assigned codes, high correlation is only achieved when the wireless device 130-133 multiplies the message by the code that was used by access node 110.

It should be understood that communication system 100 uses a multicast channel specified in its air-interface scheme (e.g., LTE) to avoid sending repeated content one at a time to multiple devices. Orthogonal codes are assigned to each group of devices that are to receive common content. This can increase the push-to-talk capacity (possibly more than 500 users per group) in environments that can benefit from this feature. It should also be understood that communication system 100 can provide cost savings to wireless network operators by reducing the number of required access nodes 110.

Figure 2:
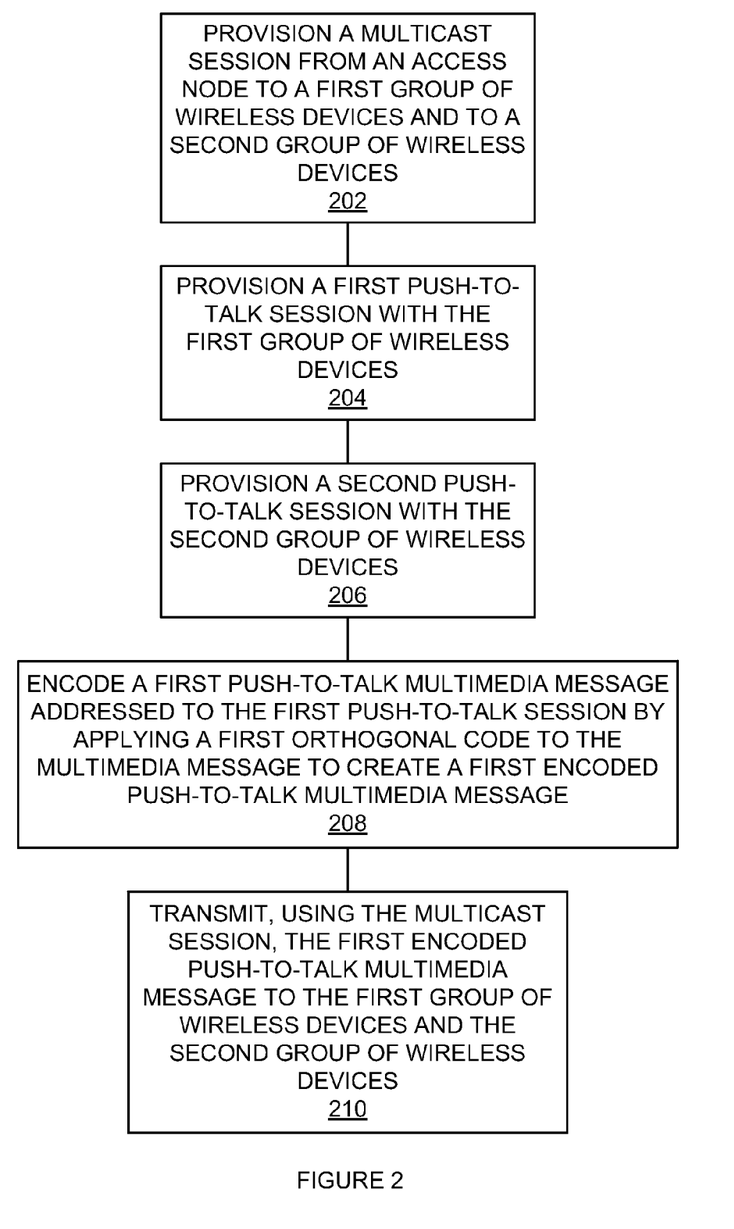
FIG. 2 is a flowchart illustrating a method of operating a wireless communication system.

FIG. 2 is a flowchart illustrating a method of operating a wireless communication system. The steps illustrated in FIG. 2 may be performed by one or more elements of communication system 100. A multicast session from an access node is provisioned to a first group of wireless devices and to a second group of wireless devices (202). For example, access node 110 may provision a multicast session to push-to-talk group 160 and to push-to-talk group 161. Accordingly, each of wireless devices 130-133 receives multicast messages from access node 110. The multicast session may use, for example, the MTCH channel specified by the LTE standard.

A first push-to-talk session is provisioned with the first group of wireless devices (204). For example, PoC processing node 150 may setup a push-to-talk session with each of wireless devices 130-131 of push-to-talk group 160. Access node 110 may configure each of wireless devices 130-131 of push-to-talk group 160 to decode push-to-talk multimedia messages using a first orthogonal code.

A second push-to-talk session is provisioned with the second group of wireless devices (206). For example, PoC processing node 150 may setup a push-to-talk session with each of wireless devices 132-133 of push-to-talk group 161. Access node 110 may configure each of wireless devices 132-133 of push-to-talk group 161 to decode push-to-talk multimedia messages using a second orthogonal code.

A first push-to-talk multimedia message addressed to the first push-to-talk session is encoded by applying a first orthogonal code to the first push-to-talk multimedia message to create a first encoded push-to-talk multimedia message (208). For example, a push-to-talk message addressed to push-to-talk group 160 may be encoded by multiplying a push-to-talk message received from PoC processing node 150 by the first orthogonal code. The result of encoding the message addressed to push-to-talk group 160 is an encoded push-to-talk multimedia message. In another example, a push-to-talk message addressed to push-to-talk group 160 may be encoded by PoC processing node 150.

Using the multicast session, the first encoded push-to-talk multimedia message is transmitted to the first group of wireless devices and the second group of wireless devices (210). For example, access node 110 may transmit the encoded push-to-talk multimedia message using the multicast session. Transmission via the multicast session by access node 110 results in all of the wireless devices 130-133 participating in the multicast session receiving the encoded push-to-talk multimedia message (i.e., not just the wireless device 130-131 of push-to-talk group 160).

A second push-to-talk multimedia message addressed to the second push-to-talk session can be encoded by applying a second orthogonal code to second multimedia message to create a second encoded push-to-talk multimedia message. For example, a push-to-talk message addressed to push-to-talk group 161 may be encoded by multiplying a push-to-talk message received from PoC processing node 150 by the second orthogonal code. The result of encoding this message a second encoded push-to-talk multimedia message.

Using the multicast session, the second encoded push-to-talk multimedia message can be transmitted to the first group of wireless devices and the second group of wireless devices. For example, access node 110 may transmit the second encoded push-to-talk multimedia message using the multicast session. Transmission via the multicast session by access node 110 results in all of the wireless devices 130-133 participating in the multicast session receiving the second encoded push-to-talk multimedia message (i.e., not just the wireless device 132-133 of push-to-talk group 161).

Wireless device 132-133 of the second push-to-talk group 161 may typically attempt (using the second orthogonal code) to decode messages intended for the first push-to-talk group 160. This can produce a result that wireless device 132-133 can use to determine whether the attempted decoding was successful or unsuccessful. Correlating the output data from the attempted decoding may be used to help determine whether the attempted decoding was successful or unsuccessful.

Figure 3:
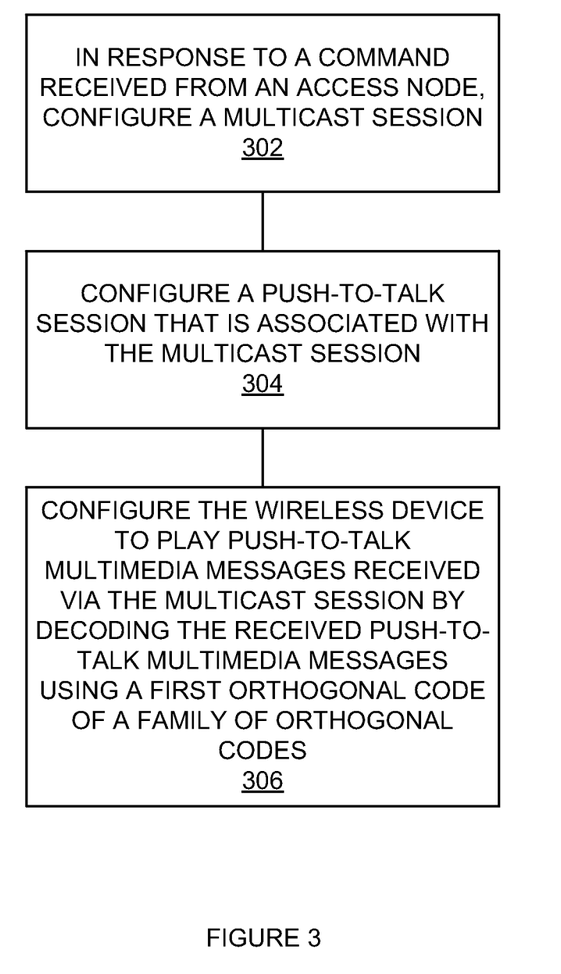
FIG. 3 is a flowchart illustrating a method of operating a wireless device.

FIG. 3 is a flowchart illustrating a method of operating a wireless device. The steps illustrated in FIG. 3 may be performed by one or more elements of communication system 100. In response to a command received from an access node, a multicast session is configured (302). For example, in response to a command from access node 110, wireless devices 130-133 may be configured to receive and process information received via a multicast session.

A push-to-talk session that is associated with the multicast session is configured (304). For example, access node 110 may configure wireless devices 130-131 of push-to-talk group 160 to receive encoded push-to-talk messages received via the multicast session.

A wireless device is configured to play push-to-talk multimedia messages received via the multicast session by decoding the received push-to-talk message using a first orthogonal code of a family of orthogonal codes (306). For example, wireless device 130 of push-to-talk group 160 may be configured to decode push-to-talk messages received via a multicast session by applying a configured orthogonal code. Once a push-to-talk message received via the multicast session is correctly decoded, and optionally determined to be valid, the wireless device can be configured to play the push-to-talk message.

Once configured, the wireless device may receive a first push-to-talk multimedia message. This first push-to-talk multimedia message may be decoded by the wireless using the configured orthogonal code to create decoded push-to-talk multimedia data. The decoded multimedia data may be analyzed to determine whether it is valid (or invalid). A correlation of the decoded push-to-talk multimedia data may be used to determine whether the decoded data is a valid (or invalid) push-to-talk message. A multimedia (e.g., audio and/or video) decoder data may be used to determine whether the decoded data is a valid (or invalid) push-to-talk message.

Figure 4:
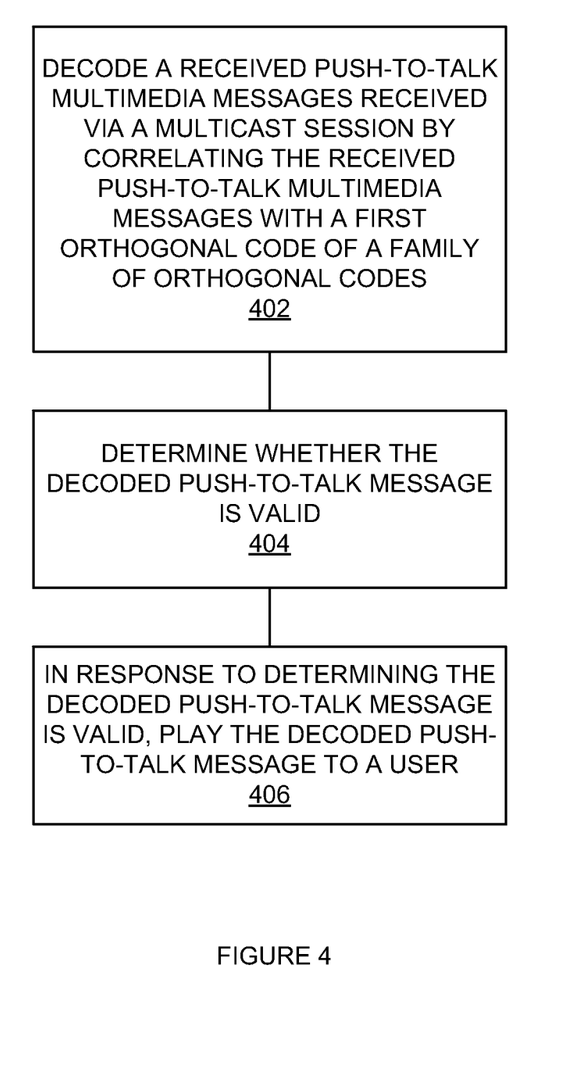
FIG. 4 is a flowchart illustrating a method of playing a received push-to-talk message.

FIG. 4 is a flowchart illustrating a method of playing a received push-to-talk message. The steps illustrated in FIG. 4 may be performed by one or more elements of communication system 100. A received push-to-talk multimedia message which was received via a multicast session is decoded by correlating the received push-to-talk message with a first orthogonal code of a family of orthogonal codes (402). For example, wireless device 130 may decode a push-to-talk message received from access node 110 by correlating the push-to-talk message with a first Walsh code.

Whether the decoded message is valid is determined (404). For example, wireless device 130 may determine whether the push-to-talk message decoded by correlating the encoded push-to-talk message with a first Walsh code is valid. Wireless device 130 may correlate the decoded message to determine whether it is valid. Wireless device 130 may use a media decoder to determine whether the decoded message is valid.

In response to determining the decoded push-to-talk message is valid, the decoded push-to-talk message is played to a user (406). For example, after determining that the decoded push-to-talk message is valid, wireless device 130 may play the decoded push-to-talk message to the user of wireless device 130.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: wireless devices 131-134, access node 110, network 120, and/or PoC processing node 150.

Figure 5:
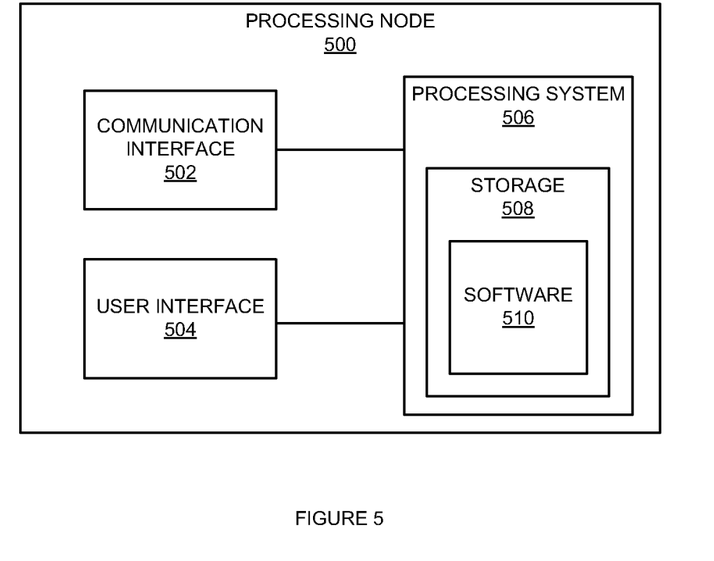
FIG. 5 illustrates a processing node.

FIG. 5 illustrates an exemplary processing node 500 comprising communication interface 502, user interface 504, and processing system 506 in communication with communication interface 502 and user interface 504. Processing node 500 is capable of paging a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples example of processing node 500 includes access node 110 and PoC processing node 150. Processing node 500 can also be an adjunct or component of a network element, such as an element of access node 110, PoC processing node 150, network 120, wireless devices 130-134, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless device in a first push-to-talk (PTT) grouping of wireless devices, comprising:
    in response to a command received from an access node, configuring a multicast session for transmission of a first encoded PTT multimedia message to the first PTT grouping of wireless devices and a second PTT grouping of wireless devices;
    decoding the first encoded PTT multimedia message using a first orthogonal code, wherein validity of the first PTT multimedia message is determined based on a correlation of the first PTT multimedia message and the first orthogonal code; and,
    when the first PTT multimedia message is valid, configuring the wireless device to play the decoded PTT multimedia messages received via the multicast session.

2. The method of claim 1, wherein a decoder algorithm associated with the multicast session is used to determine whether the decoded first PTT multimedia message is valid.

3. The method of claim 1, further comprising:
    receiving a second encoded PTT multimedia message from the access node via the multicast session; and,
    decoding the encoded second PTT multimedia message using the first orthogonal code to create decoded PTT multimedia message data.

4. The method of claim 3, further comprising:
    determining that the second decoded PTT multimedia message data is invalid.

5. The method of claim 4, wherein a second correlation of the second decoded PTT multimedia message data and the first orthogonal code is used to determine that the second decoded PTT multimedia message data is invalid.

6. A communication system, comprising:
    a push-to-talk (PTT) processing node configured to send, via a multicast session, a first encoded PTT multimedia messages to a first PTT grouping of wireless devices and a second PTT grouping of wireless devices, wherein the first PTT grouping of wireless devices is assigned a first orthogonal code and the second PTT grouping of wireless devices is assigned a second orthogonal code; and,
    a wireless access node configured to receive the first encoded PTT multimedia messages and forward, via a multicast channel, the first encoded PTT multimedia messages to at least one wireless device of the first PTT grouping of wireless devices and to a second wireless device of the second PTT grouping of wireless devices,
    wherein the at least one wireless device of the first PTT grouping of wireless devices is configured to decode the first encoded PTT multimedia messages using first orthogonal code and determine, based on a first correlation of the first PTT multimedia message and the first orthogonal code, whether the first decoded PTT multimedia messages are valid, and
    when the first PTT multimedia messages are valid, play the first decoded PTT multimedia messages received via the multicast session.

7. The communication system of claim 6, wherein the first encoded PTT multimedia messages are addressed by the PTT processing node to the first PTT grouping of wireless devices and a second encoded PTT multimedia messages is addressed to the second PTT grouping of wireless devices, and the wireless access node is also configured to encode, before forwarding via the multicast channel, the first PTT multimedia messages using the first orthogonal code and the second PTT multimedia messages using the second orthogonal code.

8. A method of operating a wireless communication system, comprising:
    establishing a first push-to-talk (PTT) grouping of wireless devices and a second PTT grouping of wireless devices within a sector served by a first access node, wherein the first PTT grouping of wireless devices is assigned a first orthogonal code and the second PTT grouping of wireless devices is assigned a second orthogonal code in a same family of orthogonal codes;
    transmitting, via a multicast session, a first PTT multimedia message over a specified channel, wherein the first PTT multimedia message is encoded with the first orthogonal code and received by each of the wireless devices in both the first PTT grouping of wireless devices and the second PTT grouping of wireless devices;
decoding, at the first PTT grouping of wireless devices, the encoded first PTT multimedia message using the first orthogonal code;
determining that the decoded first PTT multimedia message is valid based on a first correlation of the first PTT multimedia message and the first orthogonal code;
playing the decoded first PTT multimedia message to at least one wireless device in the first PTT grouping;
decoding, at the second PTT grouping of wireless devices, the first encoded PTT multimedia message using the second orthogonal code; and
determining that the decoded first PTT multimedia message is invalid based on a second correlation of the first PTT multimedia message and the second orthogonal code.

9. The method of claim 8, further comprising:
encoding a second PTT multimedia message addressed to the second PTT grouping of wireless devices by applying the second orthogonal code of to the second PTT multimedia message to create a second encoded PTT multimedia message; and,
transmitting, via the multicast session, the second encoded PTT multimedia message to the first PTT grouping of wireless devices and the second PTT grouping of wireless devices.

10. The method of claim 8, further comprising:
configuring the first PTT grouping of wireless devices to decode the first PTT multimedia messages received via the multicast session using the first orthogonal code.

11. The method of claim 9, further comprising:
configuring the second PTT grouping of wireless devices to decode the second PTT multimedia messages received via the multicast session using the second orthogonal code.

12. The method of claim 8, further comprising:
receiving, by the first access node, the first PTT multimedia message addressed to the first PTT grouping of wireless devices, the first PTT multimedia message being unencoded when received by the access node.

13. The method of claim 8, wherein the at least one wireless device in the second PTT grouping of wireless devices determines the decoding of the first encoded PTT multimedia message using the second orthogonal code was unsuccessful.

\* \* \* \* \*